(12) United States Patent
Lee et al.

(10) Patent No.: US 9,031,074 B2
(45) Date of Patent: May 12, 2015

(54) METHOD AND APPARATUS FOR PACKET CALL SETUP

(75) Inventors: Byung Bog Lee, Daejeon (KR); Se Han Kim, Daejeon (KR); Dong-Hwan Park, Daejeon (KR); In Hwan Lee, Daejeon (KR); Cheol Sig Pyo, Daejeon (KR); Hyochan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 598 days.

(21) Appl. No.: 13/415,321

(22) Filed: Mar. 8, 2012

(65) Prior Publication Data

US 2012/0230337 A1 Sep. 13, 2012

(51) Int. Cl.
*H04L 12/28* (2006.01)
*H04W 4/00* (2009.01)
*H04W 76/02* (2009.01)
*H04L 29/06* (2006.01)

(52) U.S. Cl.
CPC .............. *H04W 4/005* (2013.01); *H04W 76/02* (2013.01); *H04L 69/16* (2013.01)

(58) Field of Classification Search
USPC .......................................... 370/392
See application file for complete search history.

(56) References Cited

U.S. PATENT DOCUMENTS

| | | | |
|---|---|---|---|
| 7,716,725 B2 * | 5/2010 | Xie | 726/11 |
| 7,768,996 B1 * | 8/2010 | Fourie et al. | 370/352 |
| 8,270,421 B2 * | 9/2012 | Elliott et al. | 370/401 |
| 2008/0013531 A1 * | 1/2008 | Elliott et al. | 370/356 |
| 2009/0172138 A1 * | 7/2009 | Wang et al. | 709/223 |
| 2014/0223540 A1 * | 8/2014 | Xie | 726/13 |

* cited by examiner

*Primary Examiner* — Ayaz Sheikh
*Assistant Examiner* — Mounir Moutaouakil
(74) *Attorney, Agent, or Firm* — Rabin & Berdo, P.C.

(57) ABSTRACT

An IP packet forwarding server forwards an IP data packet between a user terminal and a machine-type communications (MTC) device allocated with a private internet protocol (IP). Such an IP packet forwarding server allocates a call identifier for connection between the user terminal and the MTC device, sets up a packet call to the MTC device and the user terminal using the call identifier, obtains packet forwarding information while setting up the packet call to the MTC device and the user terminal, and forwards an IP data packet between the MTC device and the user terminal using the packet forwarding information.

17 Claims, 8 Drawing Sheets

| Call ID | NAT IP_User | NAT sPortID_User | NAT IP_MTC | NAT sPortID_MTC | Call Life Time |
|---|---|---|---|---|---|
| X=50000 | 129.254.82.3 | 30100 | 129.254.77.2 | 40100 | 2010.12.20 10:11:50 |
| ⋮ | ⋮ | ⋮ | ⋮ | ⋮ | ⋮ |

FIG. 4

| DOMAIN NAME | IMSI |
|---|---|
| Etri.dyndns.biz | 012-3456-7899 |
| ⋮ | ⋮ |

FIG. 5

| Call ID | NAT IP_User | NAT sPortID_User | NAT IP_MTC | NAT sPortID_MTC | Call Life Time |
|---|---|---|---|---|---|
| X=50000 | | | 129.254.77.2 | 40100 | 2010.12.20 10:11:00 |

FIG. 6

| Call ID | NAT IP_User | NAT sPortID_User | NAT IP_MTC | NAT sPortID_MTC | Call Life Time |
|---|---|---|---|---|---|
| X=50000 | 129.254.82.3 | 30100 | 129.254.77.2 | 40100 | 2010.12.20 10:11:50 |

FIG. 7

METHOD AND APPARATUS FOR PACKET CALL SETUP

CROSS-REFERENCE TO RELATED APPLICATION

This application claims priority to and the benefit of Korean Patent Application No. 10-2011-0021100 filed in the Korean Intellectual Property Office on Mar. 9, 2011, the entire contents of which are incorporated herein by reference.

BACKGROUND OF THE INVENTION (a) Field of the Invention

The present invention relates a method and apparatus for setting up a packet call. More particularly, the present invention relates to a method and apparatus for setting up a packet call in order to enable a typical user terminal to access a remote communication device to which a PPP server of a communication service provider network allocates a private IP.

(b) Description of the Related Art

When a user terminal sets up a TCP/UDP socket at a remote network apparatus allocated with a private Internet protocol (IP), it requires connecting an IP sharing device to a remote network device and directly setting up the IP sharing device for port forwarding in order to change an external public IP and a TCP/UDP port number of the IP sharing device to a private IP and a TCP/UDP port number of a remote network device.

Furthermore, a point to point protocol (PPP) server, which supports an IP sharing device of a communication service provider network, does not allow a user to control port forwarding setup.

Therefore, a method for setting up an IP packet call using an IP packet forwarding server having a public IP has been demanded to enable a user terminal to access a remote network device.

SUMMARY OF THE INVENTION

The present invention has been made in an effort to provide a method for setting up a packet call having advantages of enabling a user terminal to access a remote network device without port forwarding of an IP sharing device.

An exemplary embodiment of the present invention provides a method for setting up a packet call at an IP packet forwarding server that forwards an IP data packet between a user terminal and a machine-type communications (MTC) device allocated with a private internet protocol (IP). The method may include allocating a call identifier for connection between the user terminal and the MTC device, setting up a packet call to the MTC device and the user terminal using the call identifier, obtaining packet forwarding information while setting up the packet call to the MTC device and the user terminal, and forwarding an IP data packet between the MTC device and the user terminal using the packet forwarding information.

Another exemplary embodiment of the present invention provides an internet protocol (IP) packet forwarding server for forwarding an IP data packet between a user terminal and a machine-type communications (MTC) device allocated with a private IP. The IP packet forwarding server may include a packet forwarding information management table, a call setup unit, and a forwarding controller. The packet forwarding information management table may be configured to store packet forwarding information. The call setup unit may be configured to set up a packet call between the user terminal and the MTC device. The forwarding controller may be configured to obtain the packet forwarding information while setting up a packet call between the user terminal and the MTC device, store the obtained packet forwarding information at the packet forwarding information management table, and forward an IP data packet between the user terminal and the MTC device with reference to the packet forwarding information management table.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, In addition, unless explicitly described to the contrary, the word "comprise" and variations such as "comprises" or "comprising" will be understood to imply the inclusion of stated elements but not the exclusion of any other elements.

Hereinafter, an apparatus and method for call setup in accordance with an exemplary embodiment of the present invention will be described with reference to the accompanying drawings.

Figure 1:
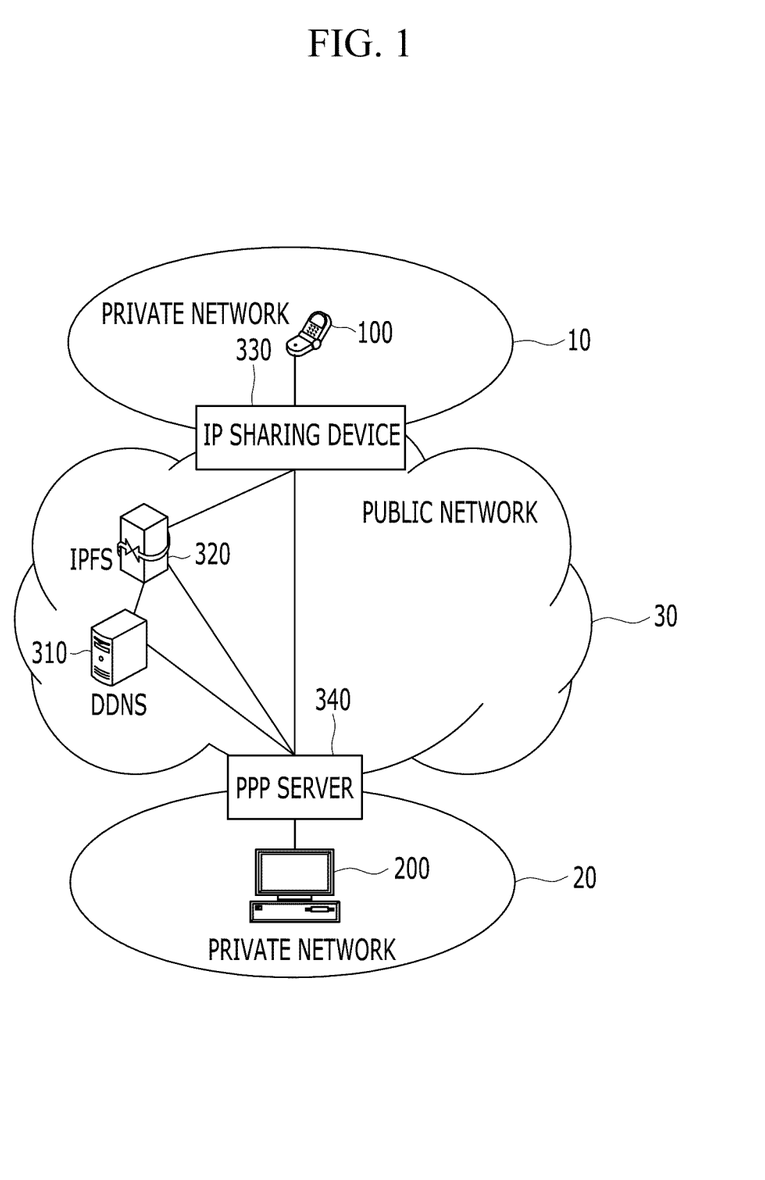
FIG. 1 illustrates a network in which an exemplary embodiment of the present invention is applied.

FIG. 1 illustrates a network to which an exemplary embodiment of the present invention is applied.

Referring to FIG. 1, a network may include private networks 10 and 20 and a public network 30, which cooperate with each other.

The private network 10 may include a user terminal 100 having a private IP. The user terminal 100 may function as a client for TCP/UDP socket communication.

The private network 20 may include at least one machine-type communications (MTC) device 200 having a private IP. The MTC device 200 may function as a server for TCP/UDP socket communication.

The user terminal 100 may access the MTC device 200 through the public network 30.

The public network 30 may include a dynamic domain name system (DDNS) 310, an IP packet forwarding server (IPFS) 320, an IP sharing device 330, and a point-to-point protocol (PPP) server 340.

The IP sharing device 330 and the PPP server 340 may have an interface for communicating with the public network 30 and the private networks 10 and 20.

The IP sharing device 330 may transmit an IP data packet between the user terminal 100 and the IPFS 320. The IP sharing device 330 may have a network address translation (NAT) function. That is, the IP sharing device 330 may change a private IP and a port number of the user terminal 100 to a public IP and a portion number of the IP sharing device 330. Here, the private IP and the port number of the user terminal 100 may be a source address of an IP data packet transmitted from the user terminal 100. After changing, the IP sharing device 330 may transmit a respective IP data packet to the IPFS 320. Furthermore, the IP sharing device 330 may change a public IP and a port number of the IP sharing device 330 to a private IP and a port number of the user terminal 100. Here, the public IP and the port number of the IP sharing device 330 may be a destination address of an IP data packet transmitted from the IPFS 320. After changing, the IP sharing device 330 may transmit a respective IP data packet to the user terminal 100.

The PPP server 340 may dynamically or statically allocate a private IP and a port number to the MTC device 200. Furthermore, the PPP server 340 may transmit an IP data packet between the MTC device 200 and the IPFS 320. Such a PPP server 340 may also have a NAT function. That is, the PPP server 340 may change a private IP and a port number of the MTC device 200 to a public IP and a port number of the PPP server 340. Here, the private IP and the port number of the MTC device 200 correspond to a source address of an IP data packet transmitted from the MTC device 200. After changing, the PPP server 340 may transmit a respective IP data packet to the IPFS 320. Furthermore, the PPP server 340 may change a public IP and a port number of the PPP server 340 to a private IP and a port number of the MTC device 200. Here, the public IP and the port number of the PPP server 340 may correspond to a destination address of an IP data packet transmitted from the IPFS 320. After changing, the PPP server 340 may transmit a respective IP data packet to the MTC device 200.

The IPFS 320 may function as a repeater of an IP packet. For example, the IPFS 320 may forward an IP packet between the user terminal 100 and the MTC device 200.

The DDNS 310 may register and manage a domain name of the MTC device 200 and a public IP of the IPFS 320 that the MTC device 200 will use. The DDNS 310 may provide the domain name of the MTC device 200 and the public IP of the IPFS 320 to the MTC device 200 in response to a request from the MTC device 200.

Figure 2:
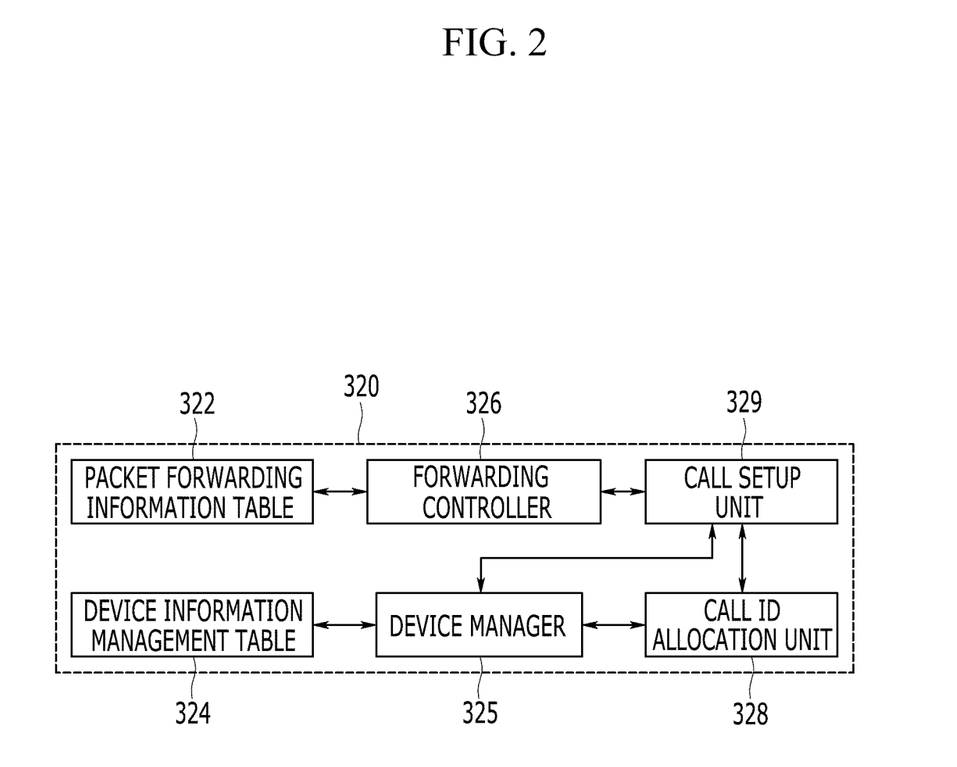
FIG. 2 illustrates an IP packet forwarding server in accordance with an exemplary embodiment of the present invention.
Figure 3:
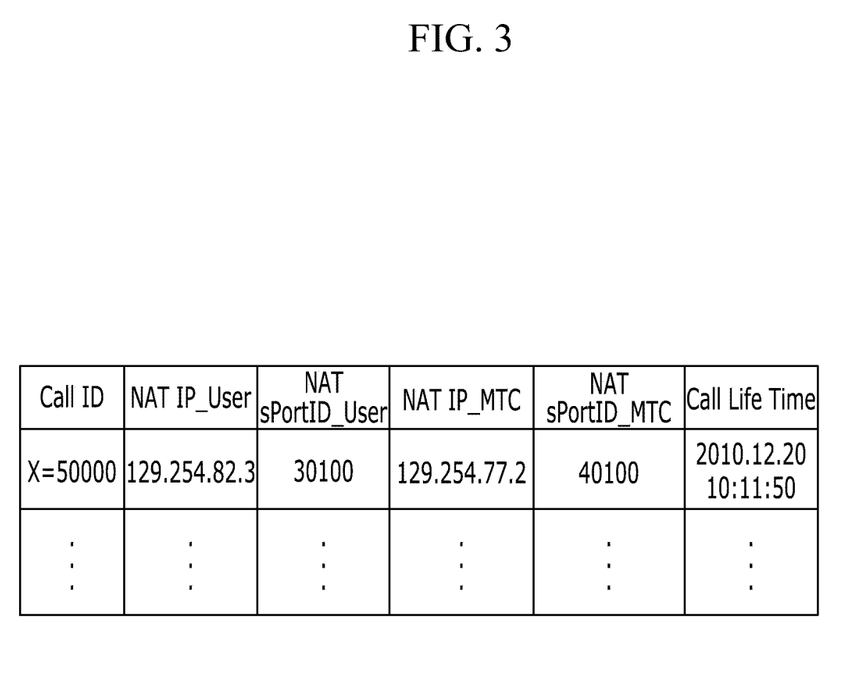
FIG. 3 illustrates a packet forwarding information management table of FIG. 2.
Figure 4:
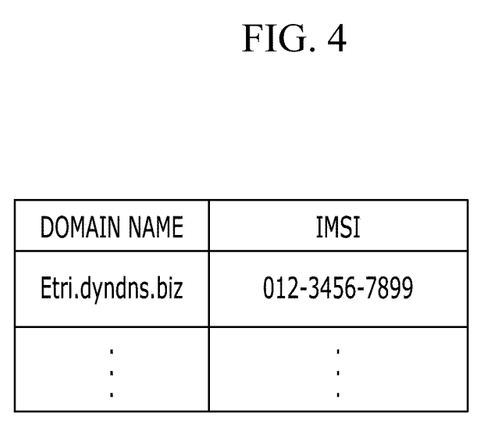
FIG. 4 illustrates a device information management table of FIG. 2.
Figure 5:
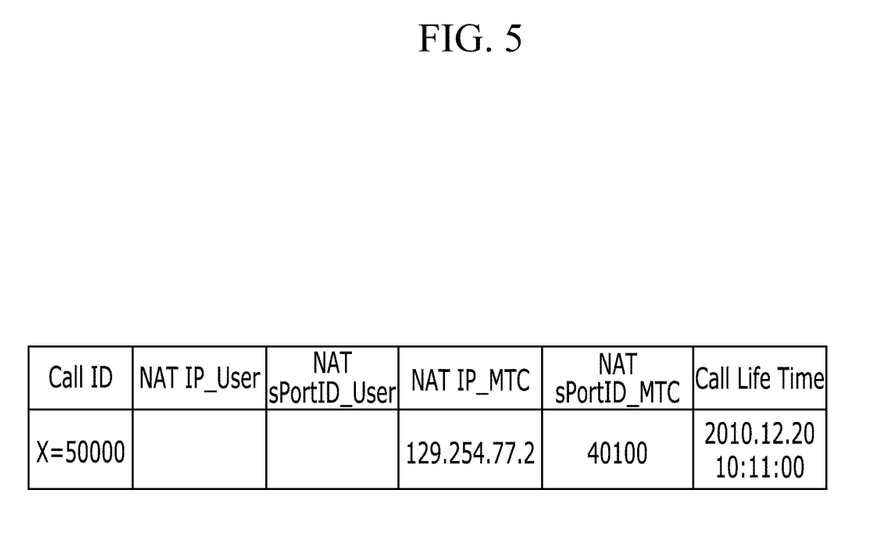
FIG. 5 and FIG. 6 illustrate registering packet forwarding information by a forwarding controller of FIG. 2.
Figure 6:
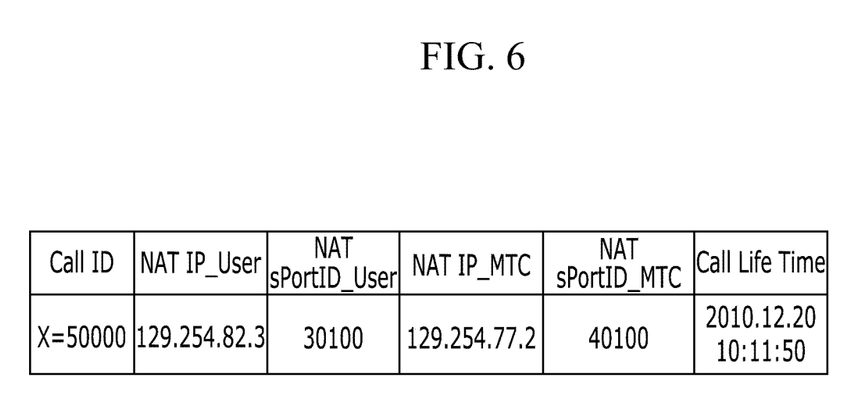

FIG. 2 illustrates an IP packet forwarding server in accordance with an exemplary embodiment of the present invention, FIG. 3 illustrates a packet forwarding information management table of FIG. 2, and FIG. 4 illustrates a device information management table of FIG. 2. Furthermore, FIG. 5 and FIG. 6 illustrate registering packet forwarding information at a forwarding controller of FIG. 2.

Referring to FIG. 2, the IPFS 320 may include a packet forwarding information management table 322, a device information management table 324, a device manager 325, a forwarding controller 326, a call identifier allocation unit 328, and a call setup unit 329.

Referring to FIG. 3, the packet forwarding information management table 322 may include a Call ID field, a NAT IP_User field, a NAT sPortID_User field, a NAT IP_MTC field, a NAT sPortID_MTC field, and a Call Lifetime field. The NAT IP_User field may be a field for a changed address of a user terminal 100. The NAT sPortID_User field may be a field for a changed port number of the user terminal 100, the NAT IP_MTC field may be a field for a changed address of the MTC device 200, and the NAT sPortID_MTC field may be a field for a changed port number of the MTC device 200.

The Call ID field may be referred to by the forwarding controller 346 for forwarding an IP data packet, and may store a call identifier. The call identifier may be a TCP/UDP socket communication port number allocated by the call identifier allocation unit 328.

The NAT IP_User field and the NAT sPortID_user field may store the changed IP and the changed port number of the user terminal 100, respectively. Hereinafter, the changed IP and the changed port number of the user terminal 100 may be referred to as a network address translation (NAT) IP and a NAT port number of the user terminal 100.

The user terminal 100 may request the IPFS 320 to set up a TCP/UDP socket. In order to request, the user terminal 100 may set up a call identifier with a destination port number of the TCP/UDP socket communication, set up a private IP and a source port number of the user terminal 100 with a source address of a socket setup IP packet, and transmit a socket setup IP packet to the IPFS 320. Then, the socket setup IP packet may be transmitted to the IPFS 320 through the IP sharing device 330. The IP sharing device 330 may change a source address of a socket setup IP packet from a private IP and a port number of the user terminal 100 to a public IP and a port number of the IP sharing device 330 and transmit the socket setup IP packet to the IPFS 320. Therefore, the source address of the socket setup IP packet arrived at the IPFS 320 may become a public IP and a port number of the IP sharing device 330 and the public IP and the port number of the IP sharing device 330 may become a NAT IP and a NAT port number of the user terminal 100.

The NAT IP_MTC field and the NAT sPortID_MTC may store a changed IP address and a changed port number of the MTC device 200, respectively. Hereinafter, the changed IP address and the changed port number of the MTC device 200 may be referred to the NAT IP and the NAT port number of the MTC device 200, respectively.

The MTC device 200 may request a TCP/UDP socket setup to the IPFS 320. In order to request, the MTC device 200 may set up a call identifier as a destination port number of TCP/UDP socket communication, set up a source address of a socket setup IP packet with a private IP and a port number of the MTC device 200, and transmit the socket setup IP packet to the IPFS 320. Then, the socket setup IP packet may be transmitted to the IPFS 320 through the PPP server 340. The PPP server 340 may change the source address of the socket setup IP packet from the private IP and the port number of the MTC device 200 to the public IP and the port number of the PPP server 340, respectively, and transmit the socket setup IP packet to the IPFS 320. Accordingly, the source address of the socket setup IP packet arrived at the IPFS 320 may become the pubic IP and the port number of the PPP server 340 and the public IP and the port number of the PPP server 340 may become an NAT IP and NAT port number of the MTC device 200.

The Call Lifetime field may store a lifetime value. The lifetime value may be used as information for deciding a time for releasing an IP packet call and a time for deleting a respective record from the packet forwarding information management table 322. For example, an IP packet call may be released and a corresponding record may be deleted from the packet forwarding information management table 322 if there is no IP data packet transmitted through a corresponding IP packet call path during a respective call lifetime assigned by a respective user.

The lifetime value may be updated at a time of receiving an IP data packet from the user terminal 100 or the MTC device 200 and extend a call lifetime of a corresponding record in the packet forwarding information management table 322.

Referring to FIG. 4, the device information management table 324 may include a domain name field and an international mobile station identity (IMSI) field.

The domain name field may store a domain name of the MTC device 200, and the IMSI field may store IMSI information of the MTC device 200. The domain name and the IMSI information of the MTC device 200 are information required to wake up the MTC device 200. For example, the domain name field may store tri.dyndns.biz as a domain name of an MTC device 200, and the IMSI field may store 012-3456-7899 as IMSI information.

Referring to FIG. 2 again, the device manager 325 may receive a request for registering a domain name and IMSI information of the MTC device 200 from the MTC device 200 and register the domain name and IMSI information of the MTC device 200 at the device information management table 324. The domain name of the MTC device 200 may be defined according to a domain name rule registered at the DDNS 310.

The forwarding controller 326 may extract packet forwarding information for forwarding an IP data packet during setting up a packet call between the user terminal 100 and the MTC device 200, register the extracted packet forwarding information at the packet forwarding information management table 322, and manage the packet forwarding information. Furthermore, the forwarding controller 326 may forward an IP data packet between the user terminal 100 and the MTC device 200 with reference to the packet forwarding information management table 322.

Particularly, the forwarding controller 326 may receive a socket setup IP packet having a call identifier that is assigned as a destination port number by the MTC device 200. After receiving, the forwarding controller 326 may extract a call identifier, a NAT IP, and a NAT port number of the MTC device 200 from a corresponding socket setup IP packet, and register the extracted call identifier, the extracted NAT IP, and the extracted NAT port number of the MTC device 200, and the extracted call lifetime value at the packet forwarding information management table 322. Here, the call lifetime value may be updated by adding a predetermined value thereto when a socket setup IP packet is received. For example, it is assumed that a call identifier (x) of a received socket setup IP packet is 50000, a NAT IP of the MTC device 200 is 129.254.77.2, a NAT port number of the MTC device 200 is 40100, a call lifetime value is 2010.12.20 10:10:10, and a determined lifetime value is 50 seconds. Here, 2010.12.20 10:10:10 means Dec., 20 2010, 10 o'clock 10 minutes 10 seconds. In this case, the forwarding controller 326 respectively registers 50000, 129.254.77.2, 40100, and 2010.12.20 10:11: 00 at the Call ID field, the NAT IP_MTC field, the NAT sPortID_MTC field, and the Call Lifetime field, as shown in FIG. 5.

Furthermore, the forwarding controller 326 may receive a socket setup IP packet having a call identifier that is assigned as a destination port number by the user terminal 100. Then, the forwarding controller 326 may extract a call identifier, and a NAT IP and a NAT port number of the user terminal 100 from the socket setup IP packet. The forwarding controller 326 may register the NAT IP, the NAT port number, and the call lifetime value corresponding to a recode having a call identifier matched with the call identifier extracted from the packet forwarding information management table 322. For example, when a call identifier(x) is 50000, a NAT IP of the user terminal 100 is 129.254.82.3, and a NAT port number of the user terminal 100 is 30100, the forwarding controller 326 may respectively register 129.254.82.3, 30100, and 2010.12.20 10:11:50 at a NAT IP_MTC field of the user terminal 100, a NAT sPortID_MTC field of the user terminal 100, and a call lifetime, as shown in FIG. 6. 2010.12.20 10:11:50 may be a new updated lifetime value by adding 50 seconds to a previously updated lifetime value 2010.12.20 10:11:00.

The call identifier allocation unit 328 may receive a call identifier allocation request from the user terminal 100 and allocate one of available TCP/UDP communication port numbers as a call identifier in order to enable the MTC device 200 and the user terminal 10 to use the allocated call identifier as a destination port number for TCP/UDP socket setup. Then, the call identifier allocation unit 328 may transmit a wake-up signal to the MTC device 200 in order to enable the MTC device 200 to perform TCP/UDP socket setup. The wake-up signal may include a call identifier and a public IP of the IPFS 320. Furthermore, the call identifier allocation unit 328 may transmit a call identifier to the user terminal 100 as a response to the call identifier allocation request.

The call setup unit 329 may receive a socket setup IP packet from the MTC device 200. The socket setup IP packet may include a call identifier assigned as a destination port number. Then, the call setup unit 239 may perform TCP/UDP socket setup with the MTC device 200. The call setup unit 239 may receive a socket setup IP packet having a call identifier assigned as a destination port number from the user terminal 100 and perform TCP/UDP socket setup with the user terminal 100.

Figure 7:
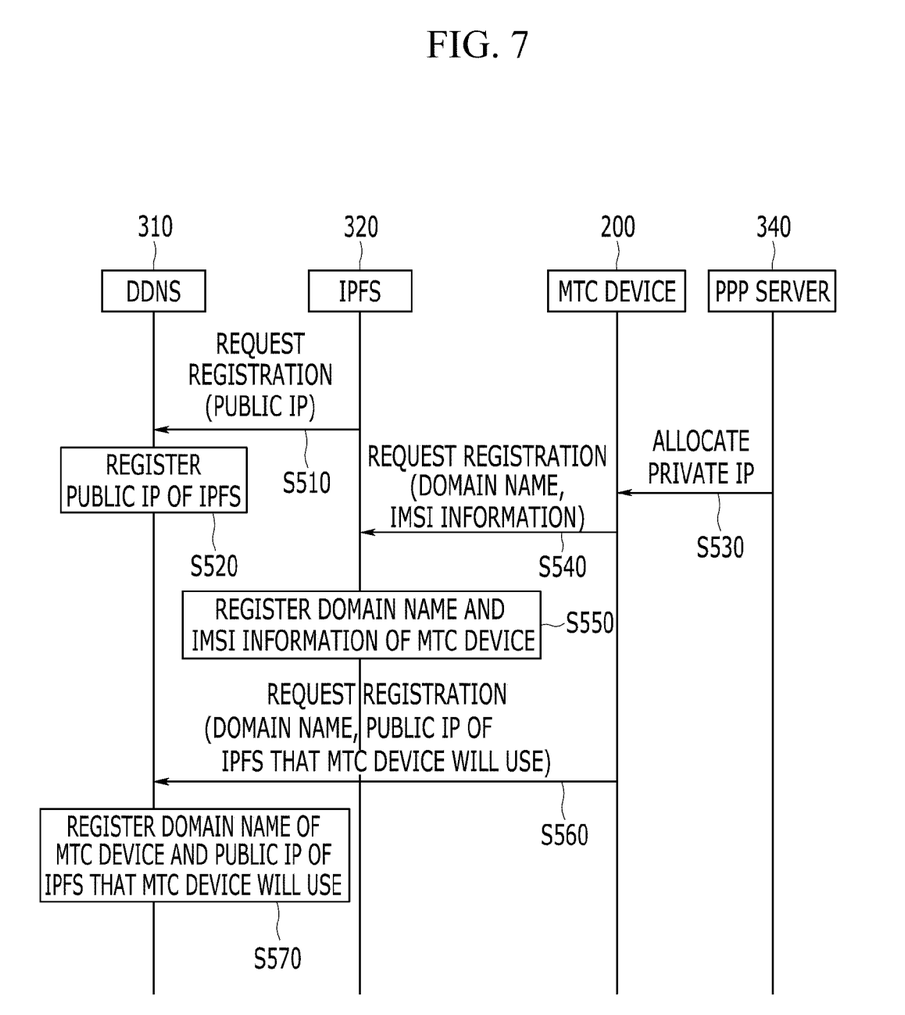
FIG. 7 illustrates a network registering procedure of an MTC device in accordance with an exemplary embodiment of the present invention.

FIG. 7 illustrates a network registration procedure of an MTC device, in accordance with an exemplary embodiment of the present invention.

The network registration procedure of the MTC device of FIG. 7 may be performed for supporting the user terminal 100 to perform IP packet setup to the MTC device 200.

Referring to FIG. 7, the IPFS 320 may request registration to the DDNS 310 by transferring an own public IP to the DDNS 310 at step S510. Then, the DDNS 310 may register the public IP of the IPFS 320 at step S520.

After the IPFS 320 is registered at the DDNS 310, the PPP server 340 may allocate a private IP to the MTC device 200 at step S530. Then, the MTC device 200 may request registering an own domain name and IMSI information at the IPFS 320 at step S540. Then, the IPFS 320 may register the domain name and IMSI information of the MTC device 200 at step S550.

The MTC device 200 may request the DDNS 310 to register the domain name of the MTC device 200 and the public IP of the IPFS 320 that the MTC device 200 will use, and the DDNS 310 may register the domain name of the MTC device 200 and the public IP address of the IPFS 320 that the MTC device 200 will use, at steps S560 and S570.

After the network registration procedure of the MTC device 200 is performed as described above, an IP packet setup procedure is performed for enabling the user terminal 100 to access the MTC device 200 that has a private IP allocated by the PPP server 340.

Figure 8:
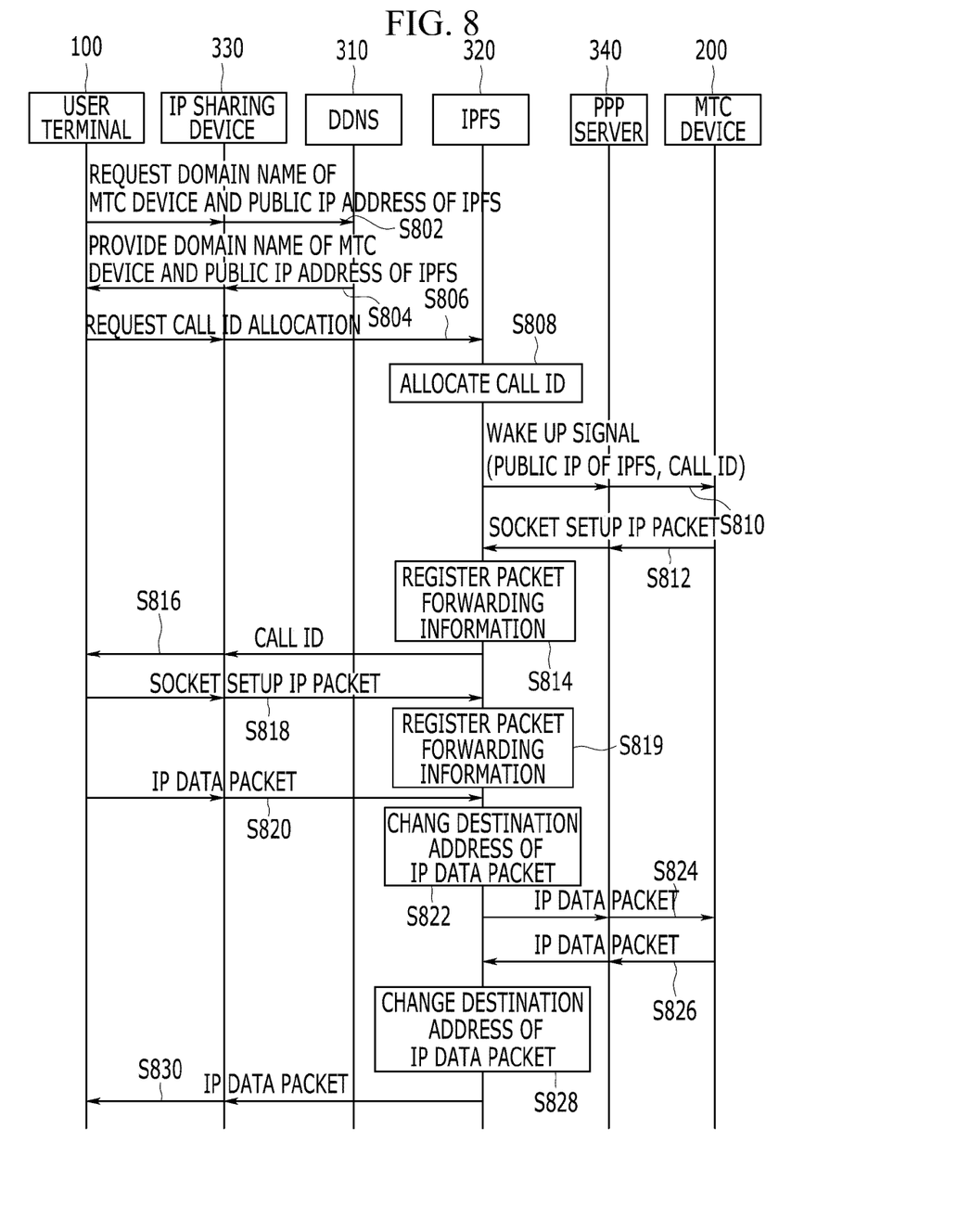
FIG. 8 illustrates an IP packet call setup procedure in accordance with an exemplary embodiment of the present invention.

FIG. 8 illustrates an IP packet call setup procedure in accordance with an exemplary embodiment of the present invention.

In the IP packet call setup procedure of FIG. 8, all signals from the user terminal 100 are transmitted through the IP sharing device 330, and all signals from the MTC device 200 are transmitted through the PPP server 340. Accordingly, detailed descriptions of operations of the IP sharing device 330 and the PPP server 340 will be omitted for convenience and ease of understanding.

Referring to FIG. 8, the user terminal 100 may request the DDNS 310 to provide a domain name of a target MTC device 200 to access and a public IP of the IPFS 320 that the target MTC device 200 will use, and obtain the requested domain name of the target MTC device 200 and the requested public IP address of the IPFS 320 at steps S802 to S804.

The user terminal 100 may request the IPFS 320 to perform call identifier allocation for accessing the MTC device 200 at step S806.

The IPFS 320 may allocate one of available TCP/UDP communication ports in order to enable the MTC device 200 and the user terminal 100 to use the allocated port as a destination port at step S808.

Then, the IPFS 320 may transmit a wake-up signal to the MTC device 200 in order for the MTC device 200 to perform TCP/UDP socket setup at step S810. The wake-up signal may include a public IP of the IPFS 320 and a call identifier. As the wake-up signal, a short text message of a mobile communication network or a paging channel signal can be used.

The MTC device 200 may extract the public IP address of the IPFS 320 and the call identifier from the wake-up signal and perform TCP/UDP socket setup by transmitting a predetermined socket setup IP packet having a call identifier assigned as a destination port number at step S812.

When the IPFS 320 successfully sets up the TCP/UDP socket to the MTC device 200, the IPFS 320 may extract packet forwarding information, such as a call identifier, a NAT IP of the MTC device 200, a port number of the MTC device 200, and a lifetime value from the socket setup IP packet, and register the extracted packet forwarding information at the packet forwarding information management table 322 at step S814. The IPFS 320 may transmit a call identifier to the user terminal 100 as a response to the call identifier allocation request of the user terminal 100 at step S816.

When the user terminal 100 receives the response to the call identifier allocation request of the user terminal 100 from the IPFS 320, the user terminal 100 may extract the call identifier form the response and perform TCP/UDP socket setup by transmitting a socket setup IP packet having a call identifier as a destination port number at step S818.

When the IPFS 320 successfully sets up the TCP/UDP socket to the user terminal 100, the IPFS 320 may extract packet forwarding information such as a call identifier, a NAT IP of the user terminal 100, and a port number of the user terminal 100 from the socket setup IP packet, and register the NAT IP of the user terminal 100 such as 129.254.82.3, the port number of the user terminal 100 such as 30100, and a lifetime value at a respective record of the packet forwarding information management table 322, which has a call identifier matched with the extracted call identifier, at step S819. When the TCP/UDP socket setup to the IPFS 320 is completed, the user terminal 100 may transmit an IP data packet to the IPFS 320 at step S820.

When the IPFS 320 receives the IP data packet from the user terminal 100, the IPFS 320 may search for a record of the packet forwarding information management table 322, which has a call identifier matched with a destination port number of the IP data packet transmitted from the user terminal 100, change the destination port number of the IP data packet and the IP address to the NAT port number and the NAT IP of the MTC device 200 of the searched record, and transmit the IP data packet, at steps S822 to S824. Then, the MTC device 200 may receive the corresponding IP data packet.

Furthermore, when the IPFS 320 receives an IP data packet transmitted to the user terminal 100 from the MTC device 200 at step S826, the IPFS 320 may search for a record of the packet forwarding information management table 322, which has a call identifier matched with a destination port number of an IP data packet transmitted from the MTC device 200, change the destination port number of the IP data packet and an IP address to a NAT port number and a NAT IP of the user terminal 100, and transmit the IP data packet, at steps S828 to S830. Then, the user terminal 100 can receive a corresponding IP data packet.

As described above, the IPFS 320 in accordance with an exemplary embodiment of the present invention may obtain information necessary for forwarding an IP data packet during a procedure of setting up an IP packet call between the MTC device 200 and the user terminal 100, and may forward an IP data packet between the MTC device 200 and the user terminal 100. Therefore, the user terminal 100 can access and communicate with the MTC device 200 having a private IP allocated by the PPP server 340 even though a communication service provider does not set up a direct port setup at the PPP server 340.

According to an exemplary embodiment of the present invention, a typical user terminal operating as a client of IP socket communication can access a remote communication device operating as a server without port forwarding setup of one of a PPP server and an IP sharing device when the remote communication apparatus is allocated with a private IP from the PPP server of an existing communication service provider network.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for setting up a packet call at an IP packet forwarding server that forwards an IP data packet between a user terminal and a machine-type communications (MTC) device allocated with a private internet protocol (IP), the method comprising:
    allocating a call identifier for connection between the user terminal and the MTC device;
    setting up a packet call to the MTC device and the user terminal using the call identifier, including
        transmitting the call identifier to the MTC device and the user terminal,
        receiving first and second socket setup IP packets respectively from the MTC device and the user terminal, the first and second socket setup IP packets both having the call identifier assigned as a destination port number therein, and
        setting up the packet call using information from the first and second socket setup IP packets;
    obtaining packet forwarding information while setting up the packet call to the MTC device and the user terminal; and
    forwarding an IP data packet between the MTC device and the user terminal using the packet forwarding information.

2. The method of claim 1, wherein the allocating a packet call includes:

receiving a call identifier allocation request from the user terminal; and allocating one of available communication ports as the call identifier.

3. The method of claim 1, before the allocating a call identifier, further comprising:

registering an own public IP at a dynamic domain name system; and registering a domain name of the MTC device and an international mobile station identity.

4. The method of claim 1, wherein the transmitting the call identifier to the MTC device includes:

transmitting a wake-up signal having the call identifier to the MTC device in order to wake up the MTC device.

5. The method of claim 1, wherein the obtaining the packet forwarding information includes extracting a call identifier and a source address from the first socket setup IP packet and registering the extracted call identifier and the extracted source address at a packet forwarding information management table.

6. The method of claim 5, wherein the obtaining the packet forwarding information further includes extracting a call identifier and a source address from the second socket setup IP packet and registering the extracted call identifier and the extracted source address at a record, which has a call identifier matched with the call identifier of the second socket setup IP packet in the packet forwarding information management table.

7. The method of claim 6, wherein the obtaining the obtaining packet forwarding information further includes registering a lifetime value when receiving the first and second socket IP packets into the packet forwarding information management table by mapping the lifetime value to a call identifier of the first and second socket setup IP packets.

8. The method of claim 7, wherein the obtaining packet forwarding information further includes releasing the packet call or deleting a corresponding record from the packet forwarding information management table according to the lifetime value.

9. The method of claim 6, wherein the forwarding includes changing a destination address of the IP data packet to a source address extracted from the first socket setup IP packet when the IP data packet is received from the user terminal and transmitting the IP data packet.

10. The method of claim 6, wherein the forwarding includes changing a destination address of an IP data packet to a source address extracted from the second socket setup IP packet when the IP data packet is received from the MTC device and transmitting the IP data packet.

11. An internet protocol (IP) packet forwarding server for forwarding an IP data packet between a user terminal and a machine-type communications (MTC) device allocated with a private IP, the IP packet forwarding server comprising:

a packet forwarding information management table configured to store packet forwarding information;

a call identifier allocation unit configured to receive a call identifier allocation request from the user terminal, allocate an identifier of one of available communication ports as a call identifier, and transfer the call identifier to the user terminal and the MTC device;

a call setup unit configured to set up a packet call between the user terminal and the MTC device using the call identifier; and a forwarding controller configured to obtain the packet forwarding information while setting up a packet call between the user terminal and the MTC device, store the obtained packet forwarding information at the packet forwarding information management table, and forward an IP data packet between the user terminal and the MTC device with reference to the packet forwarding information management table.

12. The IP packet forwarding server of claim 11, wherein the forwarding controller:

receives a first socket setup IP packet having the call identifier as a destination port number from the MTC device, extracts a source address, and stores the extracted source address in the packet forwarding information management table by mapping the extracted source address to the call identifier; and receives a second socket setup IP packet having the call identifier set up as a destination port number from the user terminal, extracts a source address, and stores the extracted source address in the packet forwarding information management table by mapping the extracted source address to the call identifier.

13. The IP packet forwarding server of claim 12, wherein the source address extracted from the first socket setup IP packet is an address obtained by changing a private IP of the MTC device through network address translation.

14. The IP packet forwarding server of claim 12, wherein when the user terminal is allocated with a public IP, the source address extracted from the second socket setup IP packet is the public IP of the user terminal, and when the user terminal is allocated with a private IP, the source address extracted from the second socket setup IP packet is an address obtained by changing the private IP of the user terminal through network address translation.

15. The IP packet forwarding server of claim 12, wherein the forwarding controller searches for a source address related to the MTC device from a record having a call identifier matched with a destination port number of an IP data packet with reference to the packet forwarding information management table when the IP data packet transmitted to the MTC device is received from the user terminal, changes a destination address of the IP data packet to the searched address, and transmits the IP data packet.

16. The IP packet forwarding server of claim 12, wherein the forwarding controller searches for a source address related to the user terminal from a record having a call identifier matched with a destination port number of an IP data packet with reference to the packet forwarding information management table when the IP packet transmitted to the user terminal is received from the MTC device, changes a destination address of the IP data packet to the searched address, and transmits the IP data packet.

17. The IP packet forwarding server of claim 11, further comprising a device manager configured to register a domain name of the MTC device and an international mobile station identity.

* * * * *